(No Model.)
S. SMALLWOOD.
FENCE WIRE BARB.
No. 254,888. Patented Mar. 14, 1882.
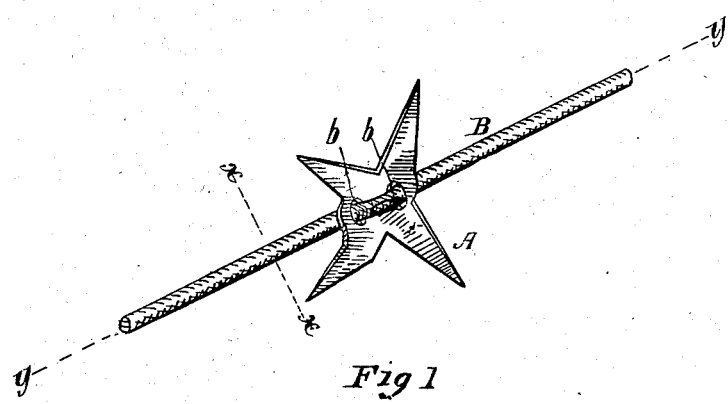
Fig 1
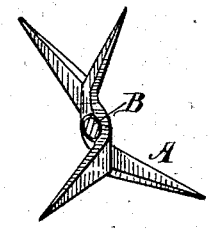
Fig 2
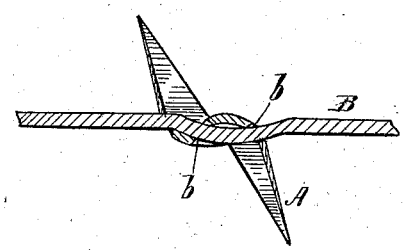
Fig 3
Fig 4
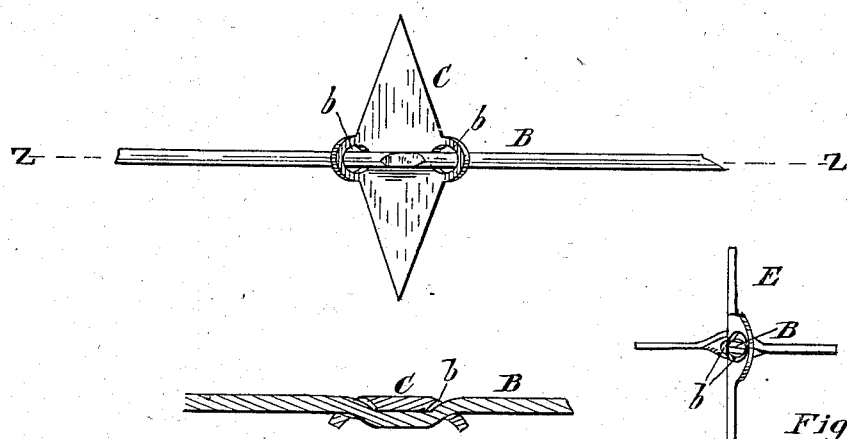
Fig 5
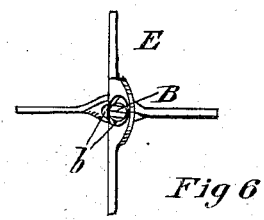
Fig 6
Witnesses
Frank F. Cole
F. U. Woodbury
Inventor
Scott Smallwood
By Frank F. Cole his atty

UNITED STATES PATENT OFFICE.

SCOTT SMALLWOOD, OF CHICAGO, ILLINOIS, ASSIGNOR OF ONE-HALF TO FRANK F. COLE, OF SAME PLACE.

FENCE-WIRE BARB.

SPECIFICATION forming part of Letters Patent No. 254,888, dated March 14, 1882.

Application filed December 23, 1881. (No model.)

*To all whom it may concern:*

Be it known that I, SCOTT SMALLWOOD, of Chicago, in the county of Cook and State of Illinois, have invented new and useful Improvements in Barbs for Fence-Wires, which are fully described in the following specification, reference being had to the accompanying drawings, in which—

Figure 1 represents a perspective view of one of my improved barbs applied to a wire; Fig. 2, a cross-section taken on the line $x\,x$, Fig. 1; Fig. 3, a plan section taken on the line $y\,y$; Fig. 4, a plan view of a modified form of barb; Fig. 5, a plan section of same, taken on line $z\,z$; and Fig. 6, an end elevation of modified form as seen at Fig. 4, showing barbs at right angles to each other.

Similar letters of reference indicate corresponding parts in the drawings.

The object of my invention is to produce an improved barb for fence-wires, which shall be both simple and inexpensive, and so arranged on the wire as to prevent it from slipping longitudinally along the wire, and also from being turned on the wire when anything is pressed against it; and it consists of a metallic strip with two holes in the center and near the outer edges thereof, and in bending the wire upon the face of the barb, as is shown in the drawings. Refuse pieces of sheet metal may be utilized in this manner and much waste saved by cutting or stamping into forms shown in the drawings for use upon fence-wires, thus obviating the expense of buying sheets of metal solely for this purpose.

In the drawings, A represents my improved barb, and $b\,b$ the holes in which the wire B is thrust. After the barb is placed in its position the operator strikes the wire in the center of the barb with a hammer or any suitable implement, which bends the barb and the wire simultaneously, and thus renders the moving in any direction of the said barb quite impossible.

C in Fig. 4 is another form of barb, made in the same manner as A; and B is the wire upon which the barb is fixed.

E is still another modification of my improved barb, and when placed in the positions shown in Fig. 6 renders any wire-fence upon which they may be placed very safe from intrusion by cattle or pigs and other animals.

I do not confine myself to any particular way of attaching these barbs; but they may be attached in any suitable or convenient way; but I prefer attaching them with a die and hammer.

Having thus described my invention, what I claim as new, and desire to secure by Letters Patent, is—

A sheet-metal barb having two holes about central and at the outer edges thereof, in combination with a single wire passing through said holes, substantially as and for the purpose specified.

SCOTT SMALLWOOD.

Witnesses:
 FRANK F. COLE,
 JACKSON WILLSEY.